Figure 1:
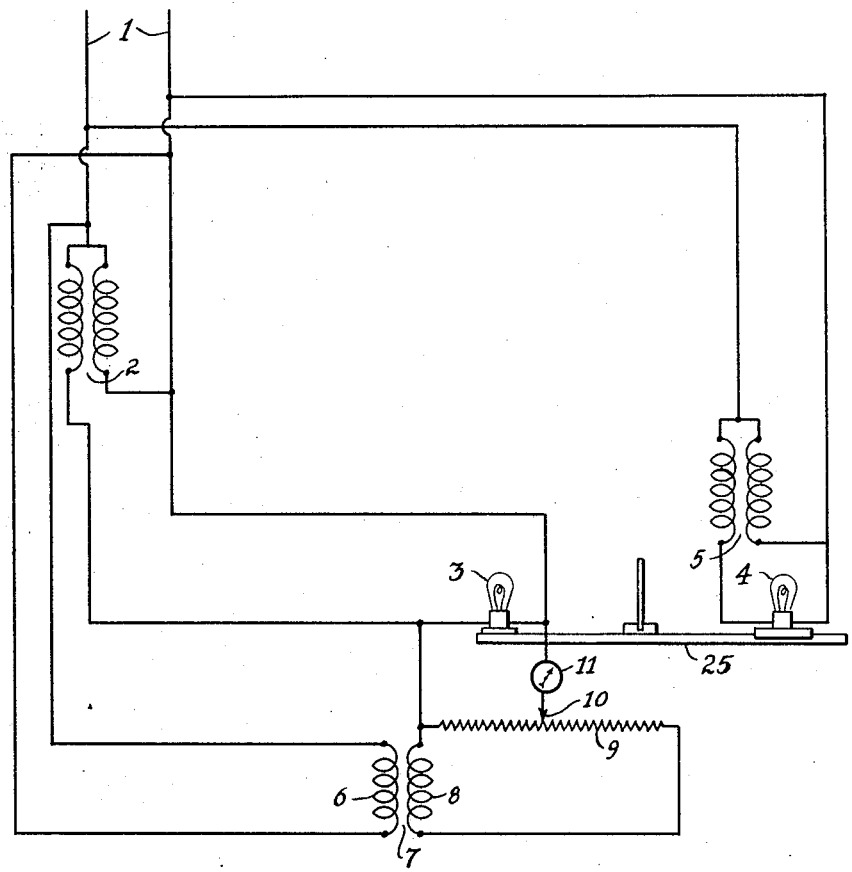

June 10, 1930.  E. D. DOYLE  1,762,769
CIRCUIT ARRANGEMENT FOR THE MEASURMENT OF THE LIGHT EMITTED BY
AND THE WATTS OR CURRENT CONSUMED BY INCANDESCENT LAMPS
Filed Aug. 2, 1927   2 Sheets-Sheet 1

INVENTOR
Edgar D. Doyle
BY
ATTORNEY

June 10, 1930.  E. D. DOYLE  1,762,769
CIRCUIT ARRANGEMENT FOR THE MEASURMENT OF THE LIGHT EMITTED BY
AND THE WATTS OR CURRENT CONSUMED BY INCANDESCENT LAMPS
Filed Aug. 2, 1927  2 Sheets-Sheet 2

Fig. 2

INVENTOR
Edgar D. Doyle
BY
Frank L. Dyer
ATTORNEY

Patented June 10, 1930

1,762,769

UNITED STATES PATENT OFFICE

EDGAR D. DOYLE, OF PHILADELPHIA, PENNSYLVANIA, ASSIGNOR TO ELECTRICAL TESTING LABORATORIES, INC., OF NEW YORK, N. Y., A CORPORATION OF NEW YORK

CIRCUIT ARRANGEMENT FOR THE MEASUREMENT OF THE LIGHT EMITTED BY AND THE WATTS OR CURRENT CONSUMED BY INCANDESCENT LAMPS

Application filed August 2, 1927. Serial No. 210,091.

My invention relates to circuit arrangements for the purposes described which are fed by an alternating current instead of the customary direct current.

In the photometry of incandescent lamps as at present practiced two things have to be determined; first the luminous output of the lamp with a given voltage on its terminals, or, in some cases, with given current through its filament; second, the current or the watts taken by the lamp at the given voltage or given current.

In the determination of luminous output, the light from the lamp to be measured is compared and balanced against the light of a comparison lamp which is so arranged that the illumination produced by it on a screen can be varied in a known ratio, as for example by moving it to a greater or less distance from the screen. The luminous output, as determined from a scale attached to the comparison lamp, is evaluated by a previous calibration using a lamp of known luminous output, that is, a standard lamp, in place of the lamp to be measured. Ordinarily, such a measurement of luminous output and also the measurement of the current or watts consumed by the lamp are effected in a circuit energized by a direct current from a storage battery, for the reason that direct current instruments are in general capable of giving results of greater precision than alternating current instruments, and also because direct current from a storage battery may be absolutely steady, whereas an alternating current supplied by a generator fluctuates somewhat in voltage, and therefore, introduces disturbing electrical variations.

The invention herein is designed to obviate the above difficulties and to provide a highly accurate and practical arrangement, whereby measurements of luminosity and current or watt consumption of incandescent lamps may be made, utilizing for the purpose alternating current.

The manner in which these things may be accomplished will be clearly understood from the accompanying drawings.

Figure 1 is a diagrammatic illustration of a circuit arrangement for determining the luminous output of incandescent lamps, and Figure 2 is a diagrammatic illustration of the same circuit with the supplemental arrangement for determining the current or watt consumption of incandescent lamps, in accordance with my invention.

Figure 1 shows a source 1 of alternating current, which for the sake of clarity will be assumed to have a potential of 120 volts. This circuit is connected through a potential regulator of inductive type 2 to the terminals of a lamp socket 3. Such regulators are well known and of various forms. They are essentially transformers in which the coupling between the two windings can be varied as for example, by varying their relative positions so that the line voltage of the circuit beyond the regulator may be stepped up or down as desired in comparison with the voltage of the supply line, without material effect upon the current being drawn from the line. Connected in a similar way to the alternating current supply is another circuit including lamp socket 4. A similar voltage regulator of inductive type 5 is included in this circuit. A third circuit is also similarly connected across the alternating current supply lines leading to the primary winding 6 of a step-up transformer 7. One end of the secondary 8 of transformer 7 is connected to one terminal of lamp socket 3 and also to one end of a potentiometer 9. The other end of the transformer secondary is connected to the other end of the potentiometer winding. The variable contact 10 of the potentiometer is connected to the other terminal of lamp socket 3 through a galvanometer 11.

Potentiometer 9 has previously been calibrated so that the voltage which it will pass to lamp socket 3 at any given setting is definitely known.

Lamp sockets 3 and 4 are integral parts of a photometer or similar instrument for determining comparative luminosity. For the purposes of this explanation it will be assumed that a photometer 25 is used of the well known type mentioned above employing a comparison lamp arranged so as to illuminate a screen, against which is compared or balanced the illumination on the screen produced by the lamp to be tested, the luminous output being directly ascertainable from a previously calibrated scale.

To determine the luminous output of a lamp by means of the circuit arrangement which has been described, a "standard" lamp, the luminous output of which at a given voltage is known, is inserted in socket 3 and the comparison lamp in socket 4. Assuming that the rated voltage of the standard lamp is 115 volts, potentiometer 9 is then adjusted so that exactly 115 volts will be impressed upon the standard lamp, assuming that the source of alternating current is exactly 120 volts. Induction regulator 2 is then adjusted until a zero reading is obtained on galvanometer 11. It is then known that the standard lamp is receiving its rated voltage if the A. C. supply is 120 volts. The comparison lamp is then moved in relation to the scale associated therewith to that position which corresponds on the scale to the rated luminous output of the standard lamp, say 1000 lumens. Induction regulator 5 is then adjusted until the illumination of the photometer screen produced by the comparison lamp exactly balances the illumination produced on the screen by the standard lamp. The apparatus is now in adjustment for the photometric determination of the luminous output of the lamp to be tested.

To this end, the standard lamp is replaced in socket 3 by the lamp to be tested. Assume that the unknown lamp is to be tested at 125 volts. Potentiometer 9 is again adjusted to that point which will insure the delivery of 125 volts to socket 3 when the source of alternating current is 120 volts. Induction regulator 2 is again adjusted until the galvanometer 11 indicates by a zero reading that an exact voltage balance has been secured between the two circuits connected to socket 3. In this way the desired voltage for the unknown lamp is obtained. The light from this lamp will, of course, illuminate the photometer screen in the same way that it was illuminated by the standard lamp, and, since no change has been made in the electrical conditions of the circuit containing the comparison lamp, the photometric reading of luminous output of the unknown lamp may be made simply by moving the comparison lamp to a greater or less distance from the screen until its illumination thereof exactly balances that created by the unknown lamp and reading the value directly from the scale of the comparison lamp.

This completes the test in so far as the determination of luminous output is concerned.

The above discussion had been predicated upon the assumption that the source of alternating current has been of an unvarying value of 120 volts. Such a condition cannot readily be secured in practice. However, because each of the circuits described is connected to the same source of alternating current in the same way and because of the inductive method employed to adjust the voltages in the circuits feeding the lamps, any fluctuation in voltage of the alternating current supply will be impressed with equal percentage values upon both the test lamp and the comparison lamp. Therefore, if the lamps have the same voltage lumen characteristics, both lamps will vary in their luminous output by the same percentage and the accuracy of the result will in no way be affected.

For example, if the standard lamp having a luminous output of 1000 lumens at 115 volts is balanced against the comparison lamp as above described, the reading on the scale of the comparison lamp, i. e. 1000 lumens, will indicate the actual luminous output of the standard lamp only if there is a potential of exactly 115 volts on the standard lamp. But if there is a greater voltage on the standard lamp and consequently a greater luminous output, there will be a proportionately greater voltage upon the comparison lamp and a proportionately greater luminous output so that the two would still illuminate the photometric screen equally. The same condition will exist when the lamp to be tested is substituted for the standard lamp. The definite ratio which has been established between the voltages on the lamps and the supply voltage will be maintained. Therefore, regardless of what the actual luminous output of the standard, comparison, or test lamp may be at any given moment, by my arrangement it is possible to tell what it would be under the conditions prescribed for the test, and to determine this by the direct reading of the photometer scale.

As a general rule, it is of little practical value to know the luminous output of an incandescent lamp unless the amount of current or electrical power consumed is also known. For the purpose of determining the amperes of current or watts of electrical power consumed by the lamp I include in my circuit arrangement the supplemental parts and circuits shown in Figure 2, which illustrates the preferred arrangement whereby not only luminous output, but current or watt consumption, may be measured. That part of the circuit for the determination of luminous output is identical to that illustrated in Figure 1, and heretofore described. The same reference numbers have been used in Figure 2. Consequently, no further description of this part of the arrangement or its method of operation is required.

The supplemental arrangement for measuring current or watt consumption is as follows:

One or more resistors 12, 13 and 14 having a negligible temperature coefficient, such as are commonly called "current shunts", of a value sufficiently low that the fall of potential across them is a negligible fraction of the voltage of the circuit, are shunted by a potentiometer 16 divided into any desired number of units of equal resistance, preferably the same number as potentiometer 9. This potentiometer is equipped with a scale so that any desired part of its total resistance may be utilized by moving the variable contact 25. Thus, a divided circuit is formed having the property common to all parallel connected conductors of this nature, that the fall in potential in one branch is proportional to the product of the resistance of the other and the current through the other. Therefore, in the arrangement above described the fall of potential across potentiometer 16 or a part thereof will be proportional to the resistance of the resistors 12, 13, 14 or such of them as are included in the main circuit of lamp socket 3 times the current through such resistors which obviously, except for the small fraction which passes through 16, is the current through the lamp in socket 3. It follows then that, when the galvanometer reads zero the fall in potential across potentiometer 16 or any part thereof is proportional to the current flowing through the lamp in socket 3. Therefore, by setting contact 25 so that the proportional part of the resistance of potentiometer 16 which is included in section 23—25 represents the rated voltage of the lamp in socket 3, the fall of potential across section 23—25 will be proportional not only to the current through the lamp, but also to the current times the volts upon the lamp as well, i. e. to its watt consumption. For example, assume two lamps each consuming 50 watts at rated voltage which, in the case of one lamp, is 110 and of the other is 125. Evidently in order that the watts may be the same the currents of these lamps at rated voltage must be in inverse ratio to their voltages; thus the current of the 110-volt lamp at 110 volts will be 125/110ths of the current of the 125-volt lamp at 125 volts, and the fall of potential in potentiometer 16 will be correspondingly increased. If, however, when the lamps are compared, different locations are taken for contact 25 so that for the 110-volt lamp the resistance of section 23—25 is 110/125ths of the resistance of this section for the 125-volt lamp, the fall of potential will be the same for either lamp.

A movable contact 15 is provided whereby one or more of the current resistors may be included in the circuit in order to adapt the circuit to the measurement of lamps of different current consumption, that is to say, so that the fall in potential in potentiometer 16 may be kept within certain limits for reasons which will be obvious to those skilled in the art.

If the voltage of the alternating current source could be maintained at an exact value, say 120 volts, which has been the value adopted for the purposes of this explanation, the current or watts consumed by the lamp in socket 3 could obviously be ascertained by measuring with a suitable instrument the potential difference between the points 23 and 25. However, such a condition of steady voltage cannot be assumed, and consequently I include in my circuit arrangement means for obviating the effect of such voltage fluctuations as may occur. To this end I include an arrangement whereby the difference of potential across potentiometer 16 or any part thereof may be balanced against a difference of potential due to a current flowing through a watt comparison lamp subject to the same voltage fluctuations.

The watt comparison lamp is simply a lamp which will react to changes in the alternating current supply in the same way and in the same proportion as the lamp in socket 3, that is to say, it must have the same volt-ampere characteristics.

In Figure 2 the watt comparison lamp is shown at 17 in a circuit connected to the source of alternating current in the same manner as the other circuits.

This circuit is coupled through transformer 18 to another circuit containing another potentiometer 19, which is also equipped with a scale, the lines of which indicate equal subdivisions of resistance.

One end 22 of potentiometer 19 is connected to one end 23 of potentiometer 16. The movable contact 24 of potentiometer 19 is connected to the movable contact 25 of potentiometer 16 through a galvanometer 20. A suitable adjustment 21 is provided in the circuit of potentiometer 19 for regulating the current in that circuit. This is shown as a simple resistance of low value.

To measure the current or watt consumption of a lamp by means of the circuit which I have described, the following operations are involved.

While the standard lamp heretofore mentioned of known current consumption and luminous output at a known voltage is in socket 3, and potentiometer 9 and induction regulator 2 are adjusted as heretofore described, so that exactly 115 volts will be impressed upon the standard lamp if the source of current is 120 volts, the movable contact 25 of potentiometer 16 is then moved to that point at which the resistance between points 23 and 25 bears to the total resistance of potentiometer 16 the same ratio as the voltage of the lamp in socket 3 bears to the voltage of the highest voltage lamp which the potentiometer is designed to measure. Then the drop in potential between point 23—25 will be proportional to the current times the volts of the lamp in socket 3. As a matter of practice potentiometers 9 and 16 may be arranged so as to be simultaneously adjusted by a single knob or other control.

Next the movable contact 24 of potentiometer 19 is set at that subdivision of its scale corresponding to the rated watts of the standard lamp. For the sake of clarity I will assume that the rated watts of the standard lamp are 50. The movable contact 24 of potentiometer 19 would therefore be set at the fiftieth subdivision of its scale. Adjustment 21 is then moved to vary the current in the circuit of potentiometer 19 until galvanometer 20 shows no deflection. It is then known that the drop of potential of section 22—24 of potentiometer 19 is exactly the same as the drop in potential across the equivalent portion, section 23—25, of potentiometer 16, and consequently proportional to and indicative of the known watt consumption of the standard lamp.

The standard lamp is now removed from socket 3 and the lamp to be tested substituted therefor. This lamp, it will be recalled, was to be tested at a potential of 125 volts. This voltage is impressed upon the lamp as previously described by a suitable adjustment of potentiometer 9 and induction regulator 2. The movable contact 25 of potentiometer 16 is moved to that point at which the resistance between points 23 and 25 will bear to the total resistance of potentiometer 16 the same ratio as the voltage of this lamp bears to the voltage of the highest voltage lamp which the potentiometer is designed to measure. Then, as already explained, the fall of potential between points 23 and 25 will be proportional to the current times the volts of the lamp in socket 3, that is proportional to the watts of the lamp.

Contact 24 of potentiometer 19 is also moved until galvanometer 20 again shows no deflection. A condition has again been established wherein the fall of potential in section 22—24 of potentiometer 19 is proportional to the watts of the lamp in socket 3, and what this watt consumption is may be read directly from the scale; thus the watt consumption of the lamp is established.

Any fluctuation in voltage of the source of alternating current will, because of the circuit arrangement of my invention, be proportionately reflected in the several circuits and will consequently have no effect upon the measurements.

What has been determined is, in fact, not the actual watt consumption but the comparative watt conseumption of the standard and test lamps at whatever voltage may be on them at the instants of measurement. For example, if the rated watts of the standard lamp at 115 volts are 50 as has been assumed and the watt consumption of the test lamp at 125 volts is in fact 40, the ratio of watt consumption would be 5/4 which ratio holds, regardless of the actual voltage. Therefore, since potentiometer 19 has been adjusted through adjustment 21 to read 50 for the standard lamp, it must read 40 for the unknown lamp, irrespective of voltage fluctuations. Consequently while these two readings really indicate a ratio they also indicate what the actual watt consumption of the test lamp is at 125 volts based on the actual watt consumption of the standard lamp at 115 volts. In short, they give watts by direct reading.

The amperes of current consumed by a lamp may obviously be ascertained by the same apparatus and method. However, for this purpose potentiometer 16 is not essential since there is no necessity of establishing a voltage proportionality. Consequently it may be omitted if desired, in which case the end 22 of potentiometer 19 will be directly connected to the supply line on one side of the resistors 12, 13 and 14 and the variable contact 24 to the other side of the resistors through galvanometer 20.

It will also be evident to those skilled in the art that transformer 18 may also be omitted if desired, the watt comparison lamp being directly connected to the circuit of potentiometer 19 instead.

Definite values and conditions have been assumed for the purpose of this description. It will be understood, however, that my invention is not limited in this way, and that by the proper selection of resistors, potentiometers and other parts having characteristics and capacities which will be conveniently co-operative, a matter involving only electrical knowledge common to anyone skilled in the art, my invention may be utilized for determining the indicated characteristics of all types and sizes of incandescent lamps. Also it may be put to other uses such as the comparison of the characteristics of wires unmounted in bulbs or utilized in other apparatus such as resistance or heating units and magnetizing or generating coils. Furthermore, my invention is not limited to the exact arrangement which I have described for purposes of explanation.

My invention provides an arrangement whereby the luminous output and current or watt consumption of incandescent lamps may be accurately determined, although the current utilized is alternating in nature and subject to the fluctuations in voltage which heretofore have prevented the use of alternating current for such measurements and necessitated the employment of costly and cumbersome storage batteries.

Having now described my invention, what I claim as new therein and desire to secure by Letters Patent is as follows:

1. The method of determining the luminous output of an incandescent lamp by means of alternating current by impressing a definite percentage of the alternating current upon a standard lamp of known luminous output at a known voltage, adjusting a comparison lamp also energized by the same alternating current so that its illumination is equivalent to that of the standard lamp, replacing the standard lamp by the lamp to be tested, impressing upon the lamp to be tested a percentage of the alternating current voltage bearing the same ratio to the voltage impressed upon the standard lamp as that which the voltage of the lamp to be tested bears to the known voltage of the standard lamp, and without readjusting the comparison lamp, varying the illumination which it produces until it is equivalent to that of the lamp to be tested, substantially as set forth.

2. An apparatus for determination of the luminous output of an incandescent lamp using alternating current, comprising a circuit for a comparison lamp, a circuit for the lamp to be tested, inductive means for regulating and controlling the voltages in said circuits so that the ratio between them remains constant irrespective of fluctuations in the voltage of the alternating current supply, and photometric means for comparing the lamps, substantially as set forth.

3. An apparatus for the determination of the luminous output of an incandescent lamp using alternating current, comprising a circuit for a comparison lamp, a circuit for the lamp to be tested, inductive means for regulating and controlling the voltages in said circuits so that the ratio between them remains constant irrespective of fluctuations in the voltage of the alternating current supply and of the variations of lamp filament resistance with temperature. means for indicating the percentage of supply voltage which is impressed upon the lamp to be tested, and photometric means for comparing the lamps, substantially as set forth.

4. An apparatus for the determination of the luminous output of an incandescent lamp using alternating current, comprising a circuit for the lamp to be tested having therein an induction voltage regulator, a second circuit also connected to the lamp to be tested and with the same alternating current supply, said second circuit having therein a potentiometer, a third circuit for a comparison lamp connected to the same source of alternating current having therein an induction voltage regulator, and photometric means for comparing the lamps, substantially as set forth.

5. The method of determining the watts of electric power consumed by an incandescent lamp at a given voltage in an alternating current circuit by establishing in a second circuit fed from the same source of alternating current and also containing a lamp having the same volt-ampere characteristics as the lamp to be tested, a fall of potential proportional to the watts of the lamp in the first circuit and evaluating this fall of potential, substantially as set forth.

6. The method of determining the amperes of an electric power flowing through an incandescent lamp in an alternating current circuit by establishing in a second circuit fed from the same source of alternating current and also containing a lamp having the same volt-ampere characteristics as the lamp to be tested, a fall of potential proportional to the amperes of the lamp in the first circuit and evaluating this fall of potential, substantially as set forth.

7. The method of determining the watts of electrical power consumed by an incandescent lamp at a given voltage by establishing in a circuit in shunt with the lamp circuit a drop of potential proportional to the watts consumed by the lamp, establishing an identical drop of potential in another circuit containing a lamp having the same volt-ampere characteristics as the lamp to be tested and being fed from the same source of alternating current and evaluating the drop of potential in said second circuit, substantially as set forth.

8. The method of determining the current flowing through an incandescent lamp by establishing in the circuit a drop of potential proportional to the amperes flowing through the lamp, establishing an identical drop of potential in another circuit containing a lamp having the same volt-ampere characteristics as the lamp to be tested and fed from the same source of alternating current and evaluating the drop of potential in said second circuit, substantially as set forth.

9. The method of determining the watt consumption of an incandescent lamp at a given voltage by balancing the drop of potential in a portion of the circuit containing the lamp against a drop of potential in another circuit containing a lamp which serves as a standard of reference, both of said lamps being fed from the same source of alternating current, substantially as set forth.

10. The method of determining the amperes of current flowing through an incandescent lamp by balancing the drop in potential in a portion of the circuit containing the lamp against a drop of potential in another circuit containing a lamp which serves as a standard of reference, both of said lamps being fed from the same source of alternating current, substantially as set forth.

11. A system for the determination of the electrical power consumed by an incandescent lamp, at a given voltage comprising a source of alternating current, a circuit connected thereto containing resistance of substantially zero temperature co-efficient, a potentiometer shunted across said resistance, a second circuit connected to said alternating current supply containing a lamp of similar electrical characteristics and a potentiometer, said potentiometers being connected to said circuits and to each other, so that the drop of potential in each may be made equal, substantially as set forth.

12. A system for the determination of the amperes of current flowing through an incandescent lamp comprising a source of alternating current, a circuit connected thereto containing resistance of substantially zero temperature co-efficient, a second circuit connected to said alternating current supply containing a lamp of similar electrical characteristics and a potentiometer, said potentiometer being so connected to said circuits that the drop of potential in each may be made equal, substantially as set forth.

13. A system for the determination of the watts consumed by an incandescent lamp at a given voltage comprising a circuit for the lamp connected to a source of alternating current, means for regulating the voltage on said lamp, a second circuit connected to the same source of alternating current, means for establishing therein a drop of potential proportional to the watts of the lamp in the first circuit, means for evaluating said drop of potential and means in each circuit whereby voltage fluctuations in the source of alternating current will be proportionately reflected in each circuit.

14. A system for the determining of amperes of current flowing through an incandescent lamp comprising a circuit for the lamp connected to a source of alternating current, means for regulating the voltage on said lamp, a second circuit connected to the same source of alternating current, means for establishing therein a drop of potential proportional to the amperes of the lamp in the first circuit, means for evaluating said drop of potential and means in each circuit whereby voltage fluctuations in the source of alternating current will be proportionately reflected in each circuit.

15. A system for the determination of the watts consumed by an incandescent lamp at a given voltage by means of alternating current comprising a circuit containing the lamp, a resistance in said circuit, a potentiometer shunted across said resistance, an induction voltage regulator in said circuit a second circuit connected to the source of alternating current, a lamp in said second circuit the electrical reaction of which to voltage fluctuations is proportional to that of the lamp being tested, a potentiometer in said second circuit and means whereby the drop of potential in the two potentiometers may be made equal and proportional to the watts of the lamp being tested and means for evaluating said drop of potential in the potentiometer of the second circuit.

16. A system for the determination of the amperes of current flowing through an incandescent lamp by means of alternating current comprising a circuit containing the lamp, a resistance in said circuit, an nduction voltage regulator in said circuit, a second circuit connected to the source of alternating current, a lamp in said second circuit the electrical reaction of which to voltage fluctuations is proportional to that of the lamp being tested, a potentiometer in said second circuit and means whereby the drop of potential in the potentiometer may be made proportional to the amperes of the lamp being tested and means for evaluating said drop of potential in the potentiometer of the second circuit.

17. A system for the determination of the watts consumed by an incandescent lamp at a given voltage comprising a circuit for the lamp, inductive means for regulating the voltage therein, means for establishing a drop of potential in a portion of said circuit proportional to the watts of the lamp, a second circuit containing a variable resistance, means for establishing a drop of potential in this resistance equal to that in the portion of the first circuit, means for determining the value of this drop of potential in terms of the watts of the lamp, both of said circuits being connected to the same source of alternating current and both containing means whereby voltage fluctuations in said source will cause equal percentage fluctuations in each circuit.

18. A system for the determination of the amperes of current flowing through an incandescent lamp comprising a circuit for the lamp, inductive means for regulating the voltage therein, means for establishing a drop of potential in a portion of said circuit proportional to the amperes of the lamp, a second circuit containing a variable resistance, means for establishing a drop of potential in this resistance equal to that in the portion of the first circuit, means for determining the value of this drop of potential in terms of the amperes of the lamp, both of said circuits being connected to the same source of alternating current and both containing means whereby voltage fluctuations in said source will cause equal percentage fluctuations in each circuit.

EDGAR D. DOYLE.